United States Patent
Folan et al.

(10) Patent No.: US 12,484,600 B2
(45) Date of Patent: Dec. 2, 2025

(54) EXPANDED FOAM FOR DELIVERY OF FUNCTIONAL INGREDIENTS

(71) Applicants: Boehringer Ingelheim Vetmedica GmbH, Ingelheim am Rhein (DE); WESTGATE BIOMEDICAL LIMITED, Donegal Town (IE)

(72) Inventors: Michael A. Folan, Donegal Town (IE); David J. Folan, Donegal Town (IE)

( * ) Notice: Subject to any disclaimer, the term of this patent is extended or adjusted under 35 U.S.C. 154(b) by 715 days.

(21) Appl. No.: 17/759,132

(22) PCT Filed: Jan. 19, 2021

(86) PCT No.: PCT/US2021/013941
§ 371 (c)(1),
(2) Date: Jul. 20, 2022

(87) PCT Pub. No.: WO2021/150501
PCT Pub. Date: Jul. 29, 2021

(65) Prior Publication Data
US 2023/0054761 A1    Feb. 23, 2023

Related U.S. Application Data

(60) Provisional application No. 62/963,726, filed on Jan. 21, 2020.

(51) Int. Cl.
*A23K 20/26* (2016.01)
*A23K 50/42* (2016.01)

(52) U.S. Cl.
CPC .............. *A23K 20/26* (2016.05); *A23K 50/42* (2016.05)

(58) Field of Classification Search
None
See application file for complete search history.

(56) References Cited

U.S. PATENT DOCUMENTS

| | | | |
|---|---|---|---|
| 4,089,987 A | 5/1978 | Chang | |
| 2002/0098198 A1 | 7/2002 | Watts et al. | |
| 2006/0188611 A1* | 8/2006 | Unlu | A23K 40/20 426/89 |
| 2016/0184209 A1* | 6/2016 | Axelrod | A23K 50/42 424/57 |
| 2017/0100357 A1* | 4/2017 | Folan | A61P 31/10 |
| 2017/0258913 A1 | 9/2017 | Rifkin et al. | |
| 2019/0269608 A1 | 9/2019 | Clevers et al. | |

FOREIGN PATENT DOCUMENTS

| | | |
|---|---|---|
| CA | 1094866 A | 2/1981 |
| CN | 102639129 A | 8/2012 |
| CN | 105997782 A | 10/2016 |
| EP | 0012490 A1 | 6/1980 |
| EP | 0038684 A1 | 10/1981 |
| JP | S575649 A | 1/1982 |
| WO | 2011061237 A1 | 5/2011 |
| WO | 2018206553 A1 | 11/2018 |

OTHER PUBLICATIONS

Abstract for CN105997782.

* cited by examiner

*Primary Examiner* — Dominic Lazaro
(74) *Attorney, Agent, or Firm* — Steffan Finnegan

(57) ABSTRACT

The present disclosure provides delivery systems for functional ingredients, such as drugs, nutritional supplements, botanicals, and vitamins. The delivery systems comprise an ingestible matrix within which the functional ingredient(s) are substantially uniformly and completely dispersed. The matrix comprises foams derived by physical shear of egg white to achieve amplified available dose and improved release characteristics of functional ingredients at skin and mucosal surfaces for healthcare purposes. The disclosure also provides methods of preparing and using the delivery systems.

18 Claims, No Drawings

EXPANDED FOAM FOR DELIVERY OF FUNCTIONAL INGREDIENTS

FIELD OF THE DISCLOSURE

The present disclosure relates to the field of health components or functional ingredients including medicaments and nutrients and a system for delivering the health components or functional ingredients.

BACKGROUND OF THE DISCLOSURE

Functional ingredients including drug products such as antibiotics, antiseptics and topical disinfectants designed to treat or prevent infectious disease and nutritionals including vitamins, amino acids and essential fatty acids designed to promote health and well-being in humans and animals have grown in popularity, as evidenced by the tremendous growth in the industry involved in their manufacture, production, and distribution.

Among the various classes of functional ingredients many are water-soluble, some are only soluble in oil while a few are amphipathic displaying partial solubility in oil and water in the manner of a surfactant.

The solubility of any functional ingredient greatly influences the appropriate manner of its delivery to a human or animal body, particularly oral applications where the functional ingredient is intended to affect a response on or in the gastro-intestinal tract and in topical and mucosal applications where the functional ingredient is intended to affect a response on or in the skin or mucosal membranes and by extension on structures emanating from these surfaces such as hair, nails and teeth.

Formulations of poorly soluble functional ingredients normally contain excipients designed to facilitate solubility, absorption and/or residence time on an intended surface. The available dose of any functional ingredient in such formulations is also limited by the amount of formulation that can be applied to the intended surface and the migration or release of the functional out of the formulation and onto or into the intended surface.

Several different delivery systems have been developed to attempt to improve methods of delivering various supplements or functional ingredients. For example, a number of encapsulated formulations have been developed which encapsulate or retain functional ingredients in various glassy, sintered, or chewy confectionery-type matrixes. In general, the confectionery serves as a solid continuous matrix for the active ingredient or supplement. The active ingredient is delivered according to the dissolution rate of the confectionery matrix, which confers a solid taste in the mouth. Crushing the confectionery is a solution for the consumer to speed up the release of the active ingredient but this solution may be undesirable as dental problems may arise and/or the release rate of the active ingredient incorporated therein may no longer be optimal. Depending upon the method of manufacturing the confectionery matrix, the active ingredient may suffer from deterioration or damage due to heat and/or mechanical stresses in the manufacturing process.

Often, high deterioration rates due to strong processing conditions are compensated for by overdosing of the active ingredient in the confectionery matrix, however, this is a costly method resulting in the wastage of a lot of the active ingredient. The "solid" taste a pressed tablet or glassy matrix may provide in the mouth may also be considered as not very attractive in the context of delivering active ingredients, especially if taste is unpalatable.

Accordingly, it is desirable to provide a system for efficiently delivering the functional ingredient(s) with improved solubility and release characteristics in particular for amphipathic and oil soluble functional ingredients.

SUMMARY OF DISCLOSURE

In accordance with an aspect of the present disclosure, there is provided a delivery system for one or more functional ingredient(s) wherein the delivery system represents an expanded foam matrix wherein the one or more functional ingredient(s) are substantially uniformly dispersed, said matrix comprising:
  i) an egg white component comprising between 1-50% protein concentration;
  ii) one or more heat resistant and/or heat sensitive gelling agents;
  iii) a pH regulator;
  iv) one or more plasticizers and/or humectants; and
  v) one or more source of water,
wherein said delivery system is a solid at room temperature.

In another aspect the present disclosure, there is provided a use of a delivery system for one or more functional ingredient(s) for oral administration to an animal in need thereof.

In embodiments, the present disclosure provides methods for improving oral health of companion animals.

In an embodiment the present disclosure provides a method of maintaining or improving oral health in a subject in need thereof, the method comprising administering to the subject an effective amount of an oral antimicrobial composition, wherein the oral antimicrobial composition comprises: (a) one or more saturated or unsaturated free fatty acids or a pharmaceutically acceptable salt thereof; and (b) one or more delipidised membrane lipids, as emulsifying agent for the free fatty acid(s) or the salt thereof.

In embodiments, the present disclosure provides methods for oral delivery of a health related composition comprises one or more health components for use in oral health, joint health and mobility, cardiovascular health, bone health, skin health, gut health, anti-stress/calming or other behavioral conditions, anti-parasiticides such as anti-flea or anti-tick or vaccines to a companion animal.

Additional variations and advantages of this disclosure will become apparent from the detailed description of this disclosure taken in conjunction with the accompanying Examples.

DETAILED DESCRIPTION

It is noted that in this disclosure and particularly in the claims, terms such as "comprises", "comprised", "comprising" and the like can mean "includes", "included", "including", and the like; and that terms such as "consisting essentially of" and "consists essentially of" allow for elements not explicitly recited, but exclude elements that are found in the prior art or that affect a basic or novel characteristic of the disclosure.

Unless otherwise noted, technical terms are used according to conventional usage. Definitions of common terms in molecular biology may be found in Benjamin Lewin, Genes V. published by Oxford University Press, 1994 (ISBN 0-19-854287-9); Kendrew et al. (eds.), The Encyclopedia of Molecular Biology, published by Blackwell Science Ltd., 1994 (ISBN 0-632-02182-9); and Robert A. Meyers (ed.), Molecular Biology and Biotechnology: A Comprehensive Desk Reference, published by VCH Publishers, Inc., 1995 (ISBN 1-56081-569-8).

As used above, and throughout the description of the disclosure, the following terms, unless otherwise indicated, shall be understood to have the following meanings: The singular terms "a," "an," and "the" include plural referents unless context clearly indicates otherwise. Similarly, the word "or" is intended to include "and" unless the context clearly indicate otherwise. The word "or" means any one member of a particular list and includes any combination of members of that list.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present disclosure. All methods or processes described herein can be performed in any suitable order unless otherwise indicated herein or otherwise clearly contradicted by context.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%.

Numerical ranges recited herein by endpoints include all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about."

The terms "subject," "patient," "user," and "individual" are used interchangeably herein, to refer to a human or an animal.

The terms "animal" and "companion animal" are used herein to include all mammals, birds and fish. The animal as used herein may be selected from the group consisting of equine (e.g., horse), canine (e.g., dogs, wolves, foxes, coyotes, jackals), feline (e.g., lions, tigers, domestic cats, wild cats, other big cats, and other felines including cheetahs and lynx), bovine (e.g., cattle), swine (e.g., pig), ovine (e.g., sheep, goats, lamas, bison), avian (e.g., chicken, duck, goose, turkey, quail, pheasant, parrot, finches, hawk, crow, ostrich, emu and cassowary), primate (e.g., prosimian, tarsier, monkey, gibbon, ape), humans, and fish.

The use of any and all examples, or exemplary language (e.g., "such as") provided herein, is intended merely to better illuminate the disclosure and does not pose a limitation on the scope of the disclosure unless otherwise indicated. No language in the specification should be construed as indicating any element is essential to the practice of the disclosure unless as much is explicitly stated.

The term "carrier" refers to a diluent, adjuvant, excipient, or vehicle with which the active/functional component is administered. Such pharmaceutical carriers can be sterile liquids, such as water and oils, including those of animal, vegetable or synthetic origin, such as peanut oil, soybean oil, palm oil, mineral oil, sesame oil and the like. Water or aqueous solution saline solutions and aqueous dextrose and glycerol solutions are preferably employed as carriers, particularly for injectable solutions. Alternatively, the carrier can be a solid dosage form carrier, including but not limited to one or more of a binder (for compressed pills), a glidant or lubricant, an encapsulating agent, a flavorant, and a colorant. Suitable pharmaceutical carriers are described in "Remington's Pharmaceutical Sciences" by E. W. Martin (Mack Publishing Co., Easton, Pa.); Gennaro, A. R., Remington: The Science and Practice of Pharmacy, (Lippincott, Williams and Wilkins); Liberman, et al., Eds., Pharmaceutical Dosage Forms, Marcel Decker, New York, N.Y.; and Kibbe, et al., Eds., Handbook of Pharmaceutical Excipients, American Pharmaceutical Association, Washington.

The term "effective amount" or "effective dose" as used herein refers to that amount of a health component that is known in the art to confer a health benefit; wherein the effective amount in the composition is high enough to provide the desired effect or benefit to the subject, yet low enough to avoid adverse effects such as toxicity, irritation, or allergic response, commensurate with a reasonable benefit/risk ratio when used in the manner of the present disclosure. Such effective amounts are readily ascertained by one of ordinary skill in the art and will vary with such factors as the specific health component used, the particular condition being treated, the age and general health of the subject, the duration of the treatment, the nature of concurrent therapy (if any), the specific dosage form to be used, the carrier employed, the solubility of the dose form, and the particular dosing regimen.

The terms "health component," "functional component," "health ingredient" and "functional ingredient" are used interchangeably herein as used herein refers to components or ingredients which promote health and well-being, prevent disease, or enhance well-being includes drug products such as antibiotics, antiseptics and topical disinfectants designed to treat or prevent infectious disease, antioxidants, phytochemicals, hormones, vitamins such as vitamins A, B1, B2, B6, B12; C, D, E, K, pantothenate, folic acid, pro-vitamins, minerals such as calcium, selenium, magnesium salts, available iron, and iron salts, microorganisms such as bacteria, such as live lactobacilli, fungi, and yeast, prebiotics, probiotics, trace elements, essential and/or highly unsaturated fatty acids such as omega-3 fatty acids, and mid-chain triglycerides, nutritional supplements, enzymes such as amylases, proteases, lipases, pectinases, cellulases, hemicellulases, pentosanases, xylanases, and phytases, pigments, oligopeptides, dipeptides, and amino acids, and mixtures thereof.

The term "prebiotics" as used herein refers to a "non-digestible food components that beneficially affect the host by selectively stimulating the growth and/or activity of one or a limited number of bacteria in the colon that can improve the health of the host" for example, in Gibson, G. R. & Roberfroid, M. B., *Dietary Modulation of the Human Colonic Microbiota-Introducing the Concept of Probiotics*, J. Nutr. 125:1401-1412 (1995). Such prebiotics may be naturally-occurring, synthetic, or developed through the genetic manipulation of organisms and/or plants, whether such new source is now known or developed later. Prebiotics useful in the present disclosure may include oligosaccharides, polysaccharides, and other prebiotics that contain fructose, xylose, soya, galactose, glucose and mannose, for example, in Ramirez-Farias et al., Br J Nutr (2008)4:1-10; Pool-Zobel and Sauer, J Nutr (2007), 137:2580 S-2584S. More specifically, prebiotics useful in the present disclosure may include lactulose, lactosucrose, raffinose, gluco-oligosaccharide, inulin, polydextrose, polydextrose powder, fructo-oligosaccharide, isomalto-oligosaccharide, soybean oligosaccharides, lactosucrose, xylo-oligosacchairde, chito-oligosaccharide, mannan oligosaccharides or mannooligo-saccharides (MOS), aribino-oligosaccharide, siallyl-oligosaccharide, fuco-oligosaccharide, galacto-oligosaccharide, and gentio-oligosaccharides. Furthermore, prebiotics useful in the present disclosure include molecules such as beta-methyl-d-galactoside and N-acetyl-d-mannosamine, for example, in Slomka et al., J Clin Periodontol. (2017), 44(4):344-352. In one embodiment, the daily dose of prebiotic is from about 0.00001 g to about 1 g, more preferably from about 0.0001 g to about 0.5 g and, even more preferably, from about 0.0005 g to about 0.1 g, of the prebiotic.

The term "probiotic" as used herein refers to live, dead, and inactivated microorganisms which, when administered in adequate amounts, confer a beneficial effect on the health or well-being of the host. Examples of such probiotics include substantially pure bacteria (i.e., a single isolate), or a mixture of desired bacteria. Health benefits may include those relating to cardiovascular health, bone health, gut health, oral health, skin or dermal health, anti-stress or behavioral health, and immune health. For the purpose of the present disclosure, "probiotics" is further intended to include the active metabolites generated by the microorganisms of the present disclosure, if they are not separately indicated. Such cell metabolites may be obtained by using lysates of probiotic bacteria or fermentation supernatants. Metabolites may include organic and inorganic molecules, alcohols, aldehydes, amino acids, carbohydrates and components thereof, peptides, proteins and components thereof, extracellular enzymes, cell-wall-bound enzymes, membrane-bound or intracellular enzymes, electron transport molecules and components thereof, or other cell-wall, membrane or cytoplasmic components and molecules, hormones or hormone like substances, lipids, oils, fats or fatty acids and components thereof, organic acids, nucleic acids or ribonucleic acids and components thereof, carbon compounds, nitrogen compounds, phosphate compounds, pigments, and vitamins as well as mixtures of any of above components and molecules, for example, in Fernandez-Gutierrez et al., (2017) Scientific Reports|7: 11100| DOI: 10.1038/s41598-017-11446-z, and for example in MacKenzie et al., Microbiology (2010), 156, 3368-3378. For the purpose of the present disclosure, "probiotics" is further intended to include inactivated or dead probiotic bacteria and yeast such as those used to co-aggregate specific microorganisms or other prokaryotic or eukaryotic cells and components thereof.

Examples of microorganisms generally recognized as probiotics are *Acetobacterium, Acetitomaculum, Bacillus, Bacteroides, Bergeyella, Bifidobacterium, Blautia, Capnocytophaga, Clostridium, Corynebacterium, Enterococcus, Eubacterium, Holophaga, Lactobacillus, Lautropia, Leuconostoc, Moraxella, Moorella, Neisseria, Pasteurellaceae, Prevotella, Ruminococcus, Saccharomyces, Sporomusa, Staphylococcus, Stenotrophononas, Streptococcus, Treponema, Weissella, Wolinella,* and *Xenophilus* and mixtures thereof. More particularly, *Bifidobacterium animalis, Bifidobacterium lactis, Bifidobacterium longum, Lactobacillus brevis, Lactobacillus helveticus, Lactobacillus johnsonii, Lactobacillus paracasei, Lactobacillus plantarum, Lactobacillus reuteri, Lactobacillus rhamnosus, Lactococcus cremoris* or *Lactococcus lactis, Saccharomyces cerevisiae* or *Saccharomyces boulardii, Streptococcus salivarius, Streptococcus thermophilus.*

Enzymes and proteins may be also used as a health ingredient, such as amyloglucosidase, glucose oxidase or glucosidase, lactoperoxidase, mutanases, dextranases, lipases, laccases, peptidases or proteinases, xylanases, other polysaccharide degrading enzymes, and other hydrolytic enzymes; proteins such as Colostrum (Lactoferrin, sIgA), bacteriocins, lytic phage or components thereof, proteins or other inhibitors of quorum sensing in target bacteria and other microorganisms. Lipids and derivatives thereof that can be dispensed to a companion animals' mouth such as polyunsaturated or omega-3 fatty acids, monounsaturated fatty acids such as 1-tetradecanol complex (e.g. Hasturk et al., 2007, J Periodontology, Vol 78:924-932), and derivatives of fatty acids, such as those described in WO 2011/061237. Such publications and/or patent applications in this specification are incorporated by reference and relied upon in their entirety.

The term "pharmaceutically acceptable" or "veterinarily acceptable" as used herein refers to molecular entities and compositions that do not generally produce an adverse, allergic or other untoward reaction when administered to an animal. Moreover, for animal administration, it will be understood that preparations should meet sterility, pyrogenicity, general safety, and purity standards as required by FDA, USDA, or European Medicine Agency.

The term "palatant," "palatability enhancer," "flavoring agents," "flavoring", or "flavorants" means any material or substance that enhances the palatability of a food composition to an animal. A palatant or palatability enhancer can be a single material or a mixture of materials and can be a natural (either unprocessed or processed), synthetic, or part natural and part synthetic material. A palatant can be added to a composition as an additive that comprises the palatant or that comprises the palatant together with one or more other functional or non-functional materials. Palatability enhancers may be made wholly or partially from meat or poultry broth concentrate or spray-dried powder, hydrolyzed proteins, yeast and/or yeast extract, liver, spices, herbs, sweeteners, or any combination such components.

The terms "treating," "treatment," or "to treat" as used herein refers to reversing, alleviating, or inhibiting the progress of a disease, disorder, or condition; or decreasing the probability or incidence of the occurrence of a disease, or condition in a subject as compared to an untreated control population, or as compared to the same subject prior to treatment; or delaying or preventing the symptoms associated with a disease, disorder or condition. As used herein "treating" may also refer to preventing the recurrence of a disease, disorder or condition or of one or more symptoms associated with such disease, disorder, or condition.

The Delivery System

The delivery systems according to the present disclosure comprise an ingestible matrix within which one or more functional ingredient(s) are substantially uniformly and completely dispersed and in which solubility and release characteristics in the delivery of any functional ingredient, is greatly facilitated using whisked egg white foam as a delivery vehicle.

Egg white is a clear viscous dispersion of biologically active proteins in an aqueous medium surrounding the yolk of an avian egg. The egg white of domestic hens' egg is approximately 10% mixed proteins including ovalbumin, ovotransferrin, immunoglobulins, lysozyme, and avidin, among others. Egg white can be separated from the yolk by mechanical means and is commonly used in foods as a protein source and as a binder and thickener in processed meats. Egg white can be turned into a foam by whisking and beating in a manner that causes molecular shear forcing the normally coiled protein molecules to deform into a linear conformation creating a tenacious interface with trapped air bubbles. Among other food applications egg white foam is used in preparation of a variety of confections including marshmallow and nougat in which a boiling sugar syrup is blended with the whisked egg white, cooking and fixing it, and trapping the air bubbles creating a light frothy material when cooled.

The process of whisking (or beating) egg white proceeds through several stages of hardness commonly described as 'soft,' 'firm,' and 'stiff' peaks after which if whisking is continued the foam will collapse. The volume of whisked egg white is usually about 4 times greater than the original liquid egg white and the trapped air bubbles are usually microscopically dispersed with occasional large visible bubbles. Soft and firm peak foams can be blended easily with other solutions or solid dispersions in aqueous medium and in doing so they serve to disperse the trapped air throughout the combined mass. Stiff peak foams are less easily dispersed tending to break into non-homogenous clumps, but they can be cooked by gently heating after which they form a crisp honeycombed mass of which confectionary meringues are a good example.

While egg white foams are popular and commonly used for culinary purposes their use in delivery of biologically functional ingredients such as nutrients and medicaments is novel, and as disclosed here egg white foams facilitate inventive constructs that offer great utility with particular classes of functional ingredients designed for therapeutic and nutritional applications.

As disclosed herein it is possible to formulate a functional ingredient using whisked egg white foam in a manner such that the functional ingredient is concentrated at the foam-air interface (i.e., on the surface inside the individual bubbles). Egg white foams with surface concentrated functional ingredients provide a much greater available dose loading, which can be released much more rapidly as compared to a conventional topical formulation.

Among the various classes of functional ingredients many are water-soluble, some are only soluble in oil while a few are amphipathic displaying partial solubility in oil and water in the manner of a surfactant. The solubility of any functional ingredient greatly influences the appropriate manner of its delivery to a human or animal body, particularly oral applications where the functional ingredient is intended to affect a response on or in the gastro-intestinal tract and in topical and mucosal applications where the functional ingredient is intended to affect a response on or in the skin or mucosal membranes and by extension on structures emanating from these surfaces such as hair, nails, and teeth.

In general, functional ingredients including medicaments and nutritionals that are freely soluble in water present very little impediment to incorporation in any formulation. However, achieving adequate release from formulations is not always as easy because water-soluble ingredients will freely disperse throughout the entirety of the administered dose necessitating absorption or assimilation of the entire carrier to access the functional ingredient. Isolating and concentrating freely water-soluble ingredients to enhance delivery can be facilitated using whisked egg white foam wherein the water-soluble ingredient is dispersed and fixed at a foam interface with a greatly expanded surface area which provides an amplified available dose when the foam itself is dispersed in other carriers.

Formulations of poorly soluble functional ingredients normally contain excipients designed to facilitate solubility, absorption and/or residence time on an intended surface. The available dose of any functional ingredient in such formulations is also limited by the amount of formulation that can be applied to the intended surface and the migration or release of the functional out of the formulation and onto or into the intended surface. Solubility and release characteristics are critical parameters in the delivery of any functional ingredient, and as disclosed herein, both can be greatly facilitated using whisked egg white foam as a delivery vehicle.

Oil and oil soluble ingredients and many amphipaths present more challenging problems in formulation. It is well known in culinary art that any trace of oil or fat will prevent whisked egg white from foaming, equally once egg white has been whisked and foamed, the addition of trace amounts of fat or oil or oil soluble ingredients will cause the foam to collapse. Egg white foams are normally incompatible with any lipophilic (fat soluble) component and this presents a technical challenge in using such foams for enhanced delivery of oil soluble or amphipathic functional ingredients.

The use of emulsification techniques to disperse fine droplets of oil-based ingredients, particularly if such droplets are stabilized by amphipathic excipients, facilitates more flexible incorporation and release characteristics from whisked egg white foams.

An emulsion is a dispersion of oil droplets in an aqueous medium (oil in water) wherein an emulsification agent is used to prevent the oil droplets coalescing. An example of a functional emulsion is provided by Folan in U.S. patent application Ser. No. 15/384,372 based on WO 2011 061237 which is fully incorporated herein. In that application water insoluble free fatty acids (oils) are emulsified in membrane lipids of natural origin, the free fatty acid is preferably Caprylic acid and the emulsification agent is preferably de-lipidised lecithin.

Surface area is a critical a parameter affecting release characteristics and delivery of any functional ingredient. The example of an ointment on skin serves to illustrate the critical nature of surface area. The contact surface of ointment on skin is the delivery interface and the available dose of functional ingredient is the amount of the functional at the contact surface. The available dose is not immediately increased by adding additional layers of ointment because the functional must first migrate through the additional layers before it is available at the skin interface. The use of egg white foam as a delivery vehicle greatly amplifies available surface with consequentially improved release characteristics.

In the context of delivering a functional ingredient it should be recognized that the total surface area of individual foams will vary depending on the extent of whisking and the actual protein concentration of the starting solution. For the purposes of the disclosure, it is sufficient to know that a whisked egg white foam that has approximately quadrupled in volume will present a surface area approximately several hundred times greater than the original protein solution or any equivalent volume of a non-foamed formulation.

As disclosed herein it is possible to formulate a functional ingredient using whisked egg white foam in a manner such that the functional ingredient is concentrated at the foam-air interface-that is on the surface inside the individual bubbles. Egg white foams with surface concentrated functional ingredients provide a much greater available dose loading, which can be released much more rapidly, compared to a conventional topical formulation.

The delivery systems according to the present disclosure are suitable for administration to both human and non-human animals. One skilled in the art will appreciate that each delivery system can be formulated differently according to the type of animal to which it is to be administered.

For example, for administration to an animal such as a cat or a dog, meat or fish-based flavors and flavorants may be added. For administration to a human, the delivery system may be formulated, for example, as a confectionery using fruit-based or other flavors. The delivery systems are especially suited for oral administration due to their palatability. Additionally, due to the highly portable format, the delivery systems are simple and convenient to administer and to consume for both humans and other animals.

The delivery systems of the present disclosure can be tailored for specific purposes; thus, the delivery systems can be formulated with specific combinations of functional ingredients in order to produce specific physiological effects. For example, a drug delivery system can be formulated to contain certain combinations of drugs or diagnostic agents. Other delivery systems can be formulated with combinations of functional ingredients for example to promote endurance, promote cardiovascular health, control fat and/or cholesterol, promote healthy joints, maintain or improve bone density, enhance cellular antioxidant capacity, or control appetite.

The delivery systems of the present disclosure comprise one or more functional ingredient(s) substantially uniformly dispersed within a matrix which generally comprises 1) egg white at a protein concentration that forms a foaming matrix when whipped; 2) one or more heat resistant and/or heat sensitive gelling agents; 3) a pH regulator; 4) one or more plasticizers and/or humectants; 5) one or more sources of water. Moisture content and controlling the physical characteristics of the residual moisture within the matrix is facilitated by inclusion of one or more gelling agents. Additives such as natural or artificial flavorings, colorings, acidulants, buffers, and sweeteners can be included in conventional amounts in the matrix.

The delivery systems of the present disclosure can be formulated such that the matrix has a final pH in the range of about 2.5 to about 8.5. In one embodiment, the matrix has a final pH of between about 3.0 and about 8.5. Acidic pH is known in the art to promote degradation of certain functional ingredients. For delivery systems formulated to deliver functional ingredients which are sensitive to, or reactive at, acidic pH, therefore, the final pH of the matrix is neutral to mildly basic. By neutral to mildly basic pH it is meant that the final pH is between about 6.0 and about 8.5. For those functional ingredients that are more stable in acidic form, such as trimethylglycine, or functional ingredients which may react with other components at neutral pH such as glucosamine hydrochloride, the pH of the matrix of the delivery systems may have a final pH below neutral.

In one embodiment of the present disclosure, the delivery systems are formulated such that the matrix has a final pH of about 5 and thus are suitable for delivery of functional ingredients that are stable and/or unreactive at acidic pH.

As described in the Examples below, formulations containing foamed egg white will typically contain other water-soluble constituents such as gels, polymers, and organic acids which when cooked together with the egg white protein constitute the solid scaffold structure of the foam which is infused with air bubbles. When oil-based ingredients, or oil in water emulsions are added to the solid matrix there is phase repulsion between the aqueous medium and the oil droplets causing these droplets to migrate to a position of least resistance which is the water-air interface inside the trapped bubbles.

Because of the greatly expanded surface area and the concentration of oil droplets at the surfaces of the foam bubbles, formulations incorporating emulsified oils will have much greater available dose loading and much faster release characteristics compared to a similar mass of non-foamed formulation.

The texture, physical attributes, form, and shape of the matrix as described below, can be varied by altering the ratio of ingredients within the given ranges using the methods described herein or by methods familiar to a worker skilled in the art. In addition, the specific selections of the possible components provided below, must be safe for animal and/or human consumption and meet regulatory standards, such as those of the Codex Alimentarius.

Egg white foam formulations intended to deliver a functionally active emulsion have great utility in topical skin and mucosal healthcare where rapid release of available dose loading is desirable because of short transit times on the mucosa of the mouth for example. Exemplary emulsions comprise (a) one or more saturated or unsaturated free fatty acids having from 4 to 22 carbon atoms or a pharmaceutically acceptable salt thereof; and (b one or more delipidised membrane lipids, as emulsifying agent for the free fatty acid(s) or the salt thereof.

Modified formulations of the same type may be used to protect emulsion droplets using whisked egg white as a protein coat to delay gastric digestion and achieve enhanced intestinal availability and absorption of functional ingredients carried in the emulsified oil. Protein digestion in the mammalian stomach is largely due to pepsin activity at low pH. Some of the individual proteins in egg white particularly ovalbumin and ovomucoid are particularly resistant to pepsin digestion, the addition of lecithin to egg white adds to pepsin resistance and whisking prior to cooking facilitates intact gastric transfer. Once in the duodenum trypsin proteolysis will affect rapid release of the encapsulated oil emulsion and the availability of these for absorption at the enterocytes.

Emulsions of the type described above are not confined to the use of free fatty acids. Emulsification techniques may be used to deliver oil soluble ingredient either on their own or in solution in other oils such as neutral triglycerides of which Miglyol 812N from IOI Oleo, Hamburg, Germany, is one example. The same oil-water phase repulsion forces will apply to concentrate the oil droplets at the water-air interface inside the bubble, regardless of the type of oil in the emulsified droplet and regardless of any oil soluble ingredient in the oil. Examples of other oil soluble functional ingredients that would benefit from enhanced delivery in emulsions dispersed in whisked egg white foam include but are not limited to antibiotics like Mupirocin, antimycotics like Clotrimazole, antiseptics like Chlorohexidine, anti-inflammatories like Ketoprofen and nutritionals like the oil soluble vitamins A, D, E and K.

Whisked egg white foam is especially useful for incorporation and delivery of functional ingredients that exhibit amphipathic properties, these include local anesthetics such as Lidocaine, Biocides such as Benzalkonium Chloride, antimicrobial agents such as Delmopinol and anti-inflammatory agents such as curcumin. When dispersed in egg white before or after foaming, the hydrophilic aspect of an amphipathic molecule will tend to associate with the water based proteinaceous matrix while the lipophilic aspect (also hydrophobic) will naturally orientate at the water-air interface and/or with the lipophilic aspect of adjacent molecules encouraging the establishment of micellar and lamellar structures all of which can be used to engineer improved release characteristics.

In embodiments, lecithin is used in combination with whisked egg white foam. Lecithin is an amphipathic molecule which may be extracted from vegetable sources like soy and from egg yolk where it is closely associated with but distinctly separate from the egg white. As demonstrated herein lecithin may be combined with egg white before whisking where despite its amphipathic nature it has very little impact on the foaming properties of the egg white but from where it greatly facilitates inclusion and release of other amphipathic and lipophilic agents as detailed previously including but not limited to Delmopinol, curcumin, Lidocaine and Bezalkonium Chloride.

In other embodiments, lecithin is used in combination with whisked egg white to facilitate the construction of free fatty acid emulsions in situ as part of the formulating process While foamed egg white is incompatible with oil and will collapse if even a trace amount is added a method whereby specific oils such as free fatty acids in the form of their water-soluble sodium or potassium salts may be combined with the egg white before whisking without significantly affecting the foaming properties has been developed utilizing a suitable amount of an emulsifying agent like de-lipidised lecithin being added to the egg white. The salts of free fatty acids may be converted back to their protonated oil form by acidification after the foam has been integrated into the finished formulation, without affecting the foamed characteristics.

De-lipidised lecithin is amphipathic and exerts superior emulsifying properties by virtue of one facet being oil soluble and an opposing facet of the same molecule being water-soluble. De-lipidised lecithin may be added to an egg white protein solution and if allowed a suitable time to hydrate it disperses homogenously throughout.

In embodiments, a water-soluble salt of Caprylic acid such as sodium Caprylate (sodium octanoate) may also be added in an appropriate ratio with the de-lipidised lecithin. The egg white protein/de-lipidised lecithin/sodium Caprylate mix may be whisked, the texture of the blended foam is more viscous because of the added ingredients but the extent of air incorporation is approximately the same. Generally, the blended egg white foam is added to and cooked in a gel formulation after which an amount of an organic acid such as citric or ascorbic acid is added to the formulation in a molar equivalent amount relative to the amount of sodium Caprylate. The effect of the acidification is to drop the pH below the dissociation constant (pKa) of sodium Caprylate at which point the salt is converted to its water insoluble free fatty acid oil. Sodium Caprylate is intimately dispersed with de-lipidised lecithin in the egg white before being whisked and it remains intimately dispersed during and after whisking and during incorporation and cooking of the foam in the gel formulation. When the formulation is acidified below the appropriate pH value the intimately dispersed sodium Caprylate is converted to its free acid oil and associates by phase attraction with the lipophilic facet of the co-dispersed lecithin in a form similar to an emulsified oil droplet which is located at or at least very close to the air interface of the whisked egg white bubble.

It will be appreciated that any functional ingredient that does not interfere with the whisking and foaming of egg white may be incorporated directly during the whisking process. And further, incorporation at the foam air interface will enhance delivery of any compatible ingredient due to amplified available dose and improved release characteristics at the expanded surface area of the foam.

The foamed egg white matrix can optionally contain other additives such as sweeteners, chelating agents, flavorings, colorings, modified vegetable gums or celluloses, or a combination thereof that does not interfere with the whisking and foaming of egg white. It will be readily apparent that additives for inclusion in the matrix should be selected such that they do not affect the properties of the matrix, do not exhibit substantial reactivity with the functional ingredients in the matrix, and are stable during preparation of the matrix.

The sweetener can be selected from a wide variety of suitable materials known in the art. Representative, but non-limiting, examples of sweeteners include sugars including but not limited to sucrose, fructose, lactose, sorbose and glucose and alcohol derivatives of sugars including but not limited to glycerol, xylitol, sorbitol, lactitol and erythritol as plasticizers with or without additional gelling agents lend further utility in construction of whisked egg white formulations. The ratio of egg white to selected sugars and/or sugar derivatives may be in the range of 1.0:0.1 to 2.0:10.0 or from 1.0:5.0 to 1:1.

Metallic salts and free metal ions such as magnesium, calcium, zinc, and iron are frequently problematic and may inhibit reactive functional ingredients such as free fatty acids. To counteract the effect of salts and free ions, a chelating agent may be added to the egg white prior to whisking and or to other constituents in the gel scaffold. Suitable chelating agents include but are not limited to ortho-phosphates and polyphosphates such as di-sodium or di-potassium orthophosphate, di-sodium uridine monophosphate, sodium phytate and sodium hexametaphosphate. Non-phosphate based chelating agents include tri-sodium citrate and Ethylenediaminetetraacetic acid. Incorporation of a chelating agent may be from 0.1% W/V to 5.0% W/V.

Some chelating agents inhibit microbial growth due to sequestration of essential mineral metabolites particularly in environments where these are available in very low concentration. Usually, microbial growth is restored when mineral supply is supplemented although it was unexpectedly discovered, as exemplified herein, that in particular embodiments the inclusion of other functional ingredients such as emulsions of free fatty acids will act synergistically with a chelating agent to suppress microbial growth in the presence of excess mineral supplementation.

It will be appreciated by those skilled in the art that certain physiological environments have characteristically higher mineral concentrations, these include blood, serum, mucus, and saliva where di-valent metal ions are essential. In the treatment of wounds for example it may be desirable to reduce the concentration of di-valent ions such as calcium to inhibit blood clotting and in the event that a microbicidal effect was also desirable a combination of a chelating agent such as hexametaphosphate with a functional emulsion of free fatty acid would lend great utility.

Equally it is well known that saliva is super saturated with respect to calcium ion, and furthermore that non-selective deposition of calcium in dental plaque results in tenacious accretions of calculus which greatly exacerbate the risk of gum disease. In formulations that are intended to promote oral health, and or treat or prevent disease of the oral cavity, it may be an advantageous to use a calcium chelating agent to reduce calculus. Where it is desirable to include an antimicrobial effect to limit dental plaque formation the synergistic combination of hexametaphosphate and a functional emulsion of free fatty acid achieves significantly enhanced health benefits.

Chelating agents such as polyphosphates are commonly used in skin care formulations to stabilize and prevent degradation reactions commonly catalyzed by di-valent metal ions. In medicated cosmetic applications for example where it is desirable to achieve an additional antimicrobial effect a synergistic combination of a polyphosphate and a functional free fatty acid emulsion is particularly beneficial. One example of such medicated cosmetics is a skin cream for acne and a further example is a shampoo designed to ameliorate infectious dandruff.

Suitable flavorings that can be added to the delivery system include, both synthetic flavor oils and oils derived from various sources, such as plants, leaves, flowers, fruits, nuts, and the like. Representative flavor oils include spearmint oil, peppermint oil, cinnamon oil, and oil of wintergreen (methylsalicylate). Other useful oils include, for example, artificial, natural, or synthetic fruit flavors such as citrus oils including lemon, orange, grape, lime, and grapefruit, and fruit essences including apple, strawberry, cherry, pineapple, banana, raspberry, and combinations thereof.

The amount of flavoring agent employed is normally a matter of preference subject to such factors as concentration/dilution of the flavor stock, flavor type, base type, and strength desired. In general, amounts of about 0.01% to about 50% weight of a final product are useful.

In one embodiment of the present disclosure, vanillin is included in the matrix as a flavoring agent in amounts of about 1.5% In another embodiment, the flavoring agent is added in amounts of about 0.03% to about 15%.

Colorings suitable for use in foodstuffs can be optionally included in the matrix to add aesthetic appeal. A wide variety of suitable food colorings are available commercially, for example, from Warner Jenkins, St. Louis, Mo. Where a synthetic coloring agent is used in the matrix, the amount ranges from about 0.01% to about 2% by weight.

In one embodiment of the present disclosure, a synthetic coloring agent is added to the matrix in an amount between about 0.03% to about 1% by weight.

Due to the substantially uniform and complete dispersion of the functional ingredients within the matrix, the delivery systems are suitable for division into sub-units. For example, if a single unit of a delivery system of the disclosure is divided into three subunits, each subunit will contain a third of the dose of the original unit. Such division would not be possible with other delivery systems in which the functional ingredients are not evenly dispersed.

In embodiments the foamed egg white matrix is used as part of a dual action dental chew for dogs. This dual-action chew works like a toothbrush and toothpaste to keep dog mouths clean and protected from harmful bacteria. The dental chew comprises two components; a flexible base and a filling. The flexible base is shaped and designed to reduce plaque and calculus through mechanical action (scrubbing, abrasion) during the chewing process. In addition, the chew base features a 'reservoir'/cavity for the filling that contains the functional ingredient(s). The filling comprises the foamed egg white matrix and at least one functional ingredient, and wherein the filling and the functional ingredient is distributed in the mouth during the chewing process, which provides a mechanical barrier, preventing bacteria from adhering to surfaces in the oral cavity (teeth, tongue, and gums).

In embodiments the dental chew base is bone shaped and has ridges and nodules on at least a part of the exposed surface area to enhance mechanical cleaning.

In embodiments the functional ingredient in the filling comprises an emulsion comprising (a) one or more saturated or unsaturated free fatty acids having from 4 to 22 carbon atoms or a pharmaceutically acceptable salt thereof; and (b) one or more delipidised membrane lipids, as emulsifying agent for the free fatty acid(s) or the salt thereof Materials and Methods.

The construction of a whisked egg white foam with or without incorporation of functional ingredients such as salts of free fatty acids and/or lecithin is based on an aqueous dispersion of egg white proteins.

The use of fresh egg white is not particularly suitable for industrial scale process and commercially available powdered egg white offers much greater convenience as well as an opportunity to vary the concentration of protein in the foam. Egg white powder is available from many sources including Canadian Inovatech, Abbotsford, BC, Canada.

Egg white powder is re-hydrated in water that has been purified by reverse osmosis. A 10% W/W dispersion of egg white protein is 10 grams of powdered egg white in 90 grams of water. Depending on the type of foam required and the amount of other ingredients that are incorporated, dispersions of up to 40% protein may be re-hydrated. Higher protein concentrations do not build as much volume during whisking but lend themselves to other methods of foaming including the use of hydrogen peroxide and catalase enzyme.

Whisked and foamed egg white forms a protein scaffold incorporating a significant amount of trapped air which needs to be fixed by heating to about 80° C. to denature and render the scaffold insoluble. Heat transfer to the protein scaffold is facilitated by moisture content and controlling the physical characteristics of the residual moisture is facilitated by inclusion of other gelling agents (hydrocolloids). Hydrocolloids are hydrophilic polymers of vegetable, animal, microbial or synthetic origin naturally present or added to aqueous foodstuffs for a variety of reasons due to their unique textural, structural and functional properties. In general, they are used for their thickening, gelling properties, and/or heat resistance as well as their water binding and organoleptic properties. Hydrocolloids can also be used to improve and/or stabilize the texture of a food product while inhibiting crystallization. Examples of hydrocolloids include but not limited to starch, tragacanth, gluten, fumed silica, polyethylene glycol, cellulose and cellulose derivatives, gelatin, collagen, mucins, pectin, gum arabica, guar gum, acacia gum, karaya gum, locust bean gum, xanthan gum, carrageenan, agar, gellan and/or sodium alginate and combinations of these.

The selection of the hydrocolloid to be used in the matrix will depend on the pH of the matrix and the texture and consistency required for the final product. The type of hydrocolloid used will also affect the set temperature of the matrix. For example, the use of a gelatin/gellan mixture or a gelatin/pectin mixture provides a set temperature around 35° C., whereas the use of carrageenan or locust bean gum will result in a set temperature closer to 60° C., and whereas the use of agar will result in a set temperature closer to 45° C., Thus, the choice of hydrocolloid for use in the matrix is also dependent upon the properties of the functional ingredient(s) to be incorporated into the delivery system. Functional ingredients that are unstable at higher temperatures will require the selection of a hydrocolloid or mixture of hydrocolloids that have a low set temperature, whereas functional ingredients that are more stable can be used with hydrocolloids having a higher set temperature.

In one embodiment of the present disclosure, the matrix comprises gelatin. The term "gelatin" refers to a heterogeneous mixture of water-soluble proteins of high average molecular weight derived from the collagen-containing parts of animals, such as skin, bone and ossein by hydrolytic action, usually either acid hydrolysis or alkaline hydrolysis. Different types of gelatin can be prepared by altering the process parameters. Gelatin is defined generally using a "Bloom value" which indicates the strength of the gel formed under certain circumstances using the gelatin. In the preparation of confectionery, when a harder gel is desired, gelatin having a higher Bloom value is used. Conversely, when the final product is required to be more flowing, gelatin having a lower Bloom value is used. The water holding capacity of gelatin alone is lower than that of a combination of gelatin with another hydrocolloid, such as gellan or pectin, and may necessitate the use of a higher amount of gelatin to achieve the desired gelation/texture of the matrix. When the hydrocolloid in the matrix of the present disclosure comprises gelatin, the Bloom value (BL) is generally about 100 to 300BL.

In one embodiment, the Bloom value is about 260 BL. In another embodiment, a mixture of gelatins with different Bloom values is used.

As indicated above, gelatin can be combined with one or more other hydrocolloid(s) to impart slightly different characteristics to the matrix. For example, combinations of gelatin with agar, gelatin with pectin, or gelatin with agar and pectin provide a good texture to the matrix. Other combinations of hydrocolloid(s) are also contemplated, for example but not limited to, agar combined with pectin. When combinations of gelatin and agar are used in the preparation of the matrix, the ratio of gelatin:agar is typically in the range between about 1:1 to about 10:1. These relative amounts provide a cohesive structure to the delivery system.

In one embodiment of the present disclosure, a combination of gelatin and agar is used in the preparation of the matrix in a gelatin:agar ratio of about 1:1 to about 3:1.

In embodiments, the total amount of hydrocolloid incorporated into the matrix is generally between about 0.1% and about 7.0% by weight. In one embodiment, the total amount of hydrocolloid in the matrix is between about 0.5% and about 6.8% by weight. In another embodiment, the total amount is between about 1.0% and about 6.0%. In other embodiments, it is between about 2.0% and about 6.0%, between about 4.0% and about 6.0%, between about 5.0% and about 6.0% and between about 6.0% and about 7.0%.

In embodiments, the ratio of whisked egg white to selected gelling agents may in the range of 2:1 to 0.2:10, or from 0.1:1 to 1:1.

In other embodiments, the ratio of egg white to gelling agents may range from 0.01:10 to 1.0:10 or from 1.0:10 to 10:1.

A suitable grade of gelatin is 260 bloom 40 mesh available from PB Leiner, Belgium and Food grade Agar and other gelling agents are available from many sources including Special Ingredients Ltd, Chesterfield, UK.

Consideration must be given to the impact of the gelling agents on release characteristics and on the physical stability of the finished formulation in practical applications.

In embodiments, other ingredients used in formulations incorporating whisked egg white matrix include Caprylic acid or sodium Caprylate which are available from Merck Chemicals.

In embodiments, the ratio of Caprylic acid to egg white may range from 0.01:10.0 to 1.0:10 or from 0.1:1.0 to 1.0:1.0 In embodiments, other ingredients used in formulations incorporating whisked egg white matrix include lecithin.

A suitable grade of purified lecithin is available from Lipoid A G, Zurich, Switzerland. In embodiments, the ratio of lecithin to egg white may range from 0.01:10.0 to 1.0:10 or from 0.1:1.0 to 1.0:1.0.

Assay of Functional Efficacy

It should be appreciated that the disclosures herein relate to delivery of a wide range of functional ingredients providing enhanced utility in human and animal healthcare including but not limited to therapeutics, prophylactics, and nutritionals.

To illustrate the utility of formulations based on whisked egg white the following Examples make use of an antimicrobial emulsion as disclosed in Folan U.S. patent application Ser. No. 15/384,372. This functional ingredient exerts a dual antimicrobial effect by limiting adhesion of microbial species and reducing their viability through a secondary microbicidal/microbistatic effect. For comparison purposes the assay of microbicidal/microbistatic effect is used here and the method is described below.

The assay is a standard microbiological suspension test wherein known concentrations of late log phase bacteria, yeast, or fungi are inoculated into a fixed volume or weight of a test substance, blank, or control. After a set period a neutralizing solution is added to stop the antimicrobial effect and the residual population of viable microorganisms is enumerated by serial dilution and plate counting. The counting procedure is a standard and basic microbiological procedure for enumerating viable microorganisms and will be well known to those skilled in the art.

In its generic form the method requires inoculation of 1 gram or 1 ml of test sample with 0.1 ml of 18 hour (late log phase) bacterial culture followed by vigorous agitation to mix. After the pre-determined exposure time has elapsed, 9.0 ml of neutralizing buffer is added and mixed. This has the effect of stopping the microbicidal effect which allows reliable estimates to be made of the percentage kill achieved by a test sample in the period between inoculation and neutralization. Typically, exposure periods will range from 30 seconds up to 30 minutes and may progress to several hours where that time period is required to measure the effect. In order to enumerate residual viable cells and from that to compute percentage kill, the number of viable cells in the inoculum is determined by serial dilution and plate counting. Appropriate blanks and controls are used to ensure validity of the neutralizing procedure and to allow for any interference from other constituents in the test sample.

In the assays described herein, the test organism is a standard indicator bacterium, *Staphylococcus aureus* NCTC 8325-4 (National Collection of Type Cultures, Public Health England, Porton Down, Salisbury, UK) known for its tenacious biofilm forming capability. Stocks of bacteria are routinely stored on beads in 50% glycerol at −80° C. When required for viability/microbicidal assay, small aliquots from these stocks are spread on an appropriate nutrient agar, grown and sub-cultured to ensure purity. Where broth cultures are required, 250 ml Erlenmeyer flasks containing 100 ml of broth are inoculated with a transfer loop from pure agar cultures and incubated under constant agitation in a rotary incubator at 37° C.

Indicator bacteria are routinely cultured using brain heart infusion (BHI) broth and agar or tryptone soya agar or broth (TSB), both of which may be acquired commercially from Oxoid, UK. The diluting and neutralizing buffers used in the present method are phosphate buffered saline (PBS), containing 137 mM sodium chloride, 2.7 mM potassium chloride and 10 mM phosphate, to which is added 3% polysorbate Tween 80 (anionic surfactant), 0.3% lecithin, and 0.5% histidine as neutralizing agents. These 'neutralizing' agents are those prescribed under EU Guidelines for ISO certification of microbicidal efficacy and were validated as suitable for neutralizing free fatty acids at the concentrations used herein.

Test samples as prepared in the following Examples are assayed by first dissolving or dispersing a measured quantity of sample in a measured amount of sterile water. Typically, one gram of sample will be macerated in 1 gram of water which represents a 50% dilution of the sample and its effective dose load. The macerated sample is inoculated with 1 ml of 18-hour (late log phase) culture of the indicator organism, stirred and incubated at 37° C. for fixed periods of time after which 9 ml of neutralizing buffer is added and mixed by inversion. The number of viable cells in the test sample after incubation and neutralization is measured by serial dilution and plate counting and compared to the number of viable cells in 1.0 ml of control inoculum treated in exactly the same way with test sample or with a blank test sample containing no functional ingredient.

Typically an overnight culture of the indicator organism will contain in excess of 8 logs of viable cells per ml ($1.0 \times 10^8$ or 100,000,000) per ml. Typically a 2% W/W dose loading of the free fatty acid emulsion used in the following Examples will achieve greater than 90% or 1 log reduction in viability in 30 seconds of exposure and it is not unusual to see greater than 6 logs (99.9999%) reduction in 5 minutes.

EXAMPLES

These delivery systems and methods of making the delivery systems are exemplary only, other formulations and methods will be apparent to one of ordinary skill in the art, and such other formulations and methods are intended to be included within the scope of this invention.

Example 1—Egg White/Gelatin/Sorbitol Formulation Using an Oil in Water Emulsion as a Functional Ingredient

TABLE 1

Foamed egg white matrix formulation of Example 1.

| | Ingredient | Weight in grams |
|---|---|---|
| 1 | Purified water | 75 |
| 2 | Citric Acid | 0.5 |
| 3 | Egg white at 10% protein concentration | 120 |
| 4 | Gelatin 260 Bloom | 16 |
| 5 | Sorbitol | 60 |
| 6 | Powdered flavoring | 4 |
| 7 | Functional emulsion based on U.S. patent application 15/384,372 | 4 |
| | Total weight | 279.5 |

The foamed egg white matrix comprising a functional emulsion was made according to the following process;
 (a) Ingredients 1 (purified water), 2 (Citric acid), 3 (egg white), and 4 (gelatin) from Table 1 were combined in the amounts delineated in a suitable vessel at room temperature and allowed about 30 minutes to fully hydrate the gelatin,
 (b) using suitable scale equipment with whisk attachments the mass was carefully beaten/whisked for approximately 5 minutes to achieve a foam mass that holds its shape when pulled upwards—firm peaks,
 (c) the mass was heated (using a water-bath or Bain Marie) while stirring constantly and using a suitable thermocouple in the foam and bringing the mass up to about 80° C.,
 (d) ingredient 5 (Sorbitol) was added in the amount delineated in Table 1 and stirred in. The foam mass cools to approximately 60° C. due to the endothermic solubilization of the sorbitol,
 (e) the temperature was set/held at 60° C. (using for example a water bath/Bain Marie) and maintained the foam mass at this temperature,
 (f) ingredient 6 (flavoring) was added in the amount delineated in Table 1 and stirred in, and
 (g) ingredient 7 (functional emulsion) was added in the amount delineated in Table 1 and stirred in.

The foam mass can be held at 60° C. for periods of up to 5 hours without significant deterioration. The foam mass can be dispensed to molds and allowed to cool where it forms a firm flexible material.

Assay of Antimicrobial Effect:

The total weight of the formulation in Example 1 was 279.5 grams containing 4 grams of functional emulsion (1.4%). The functional emulsion contained 10% free Caprylic acid in the oil phase and so the concentration of free Caprylic acid in the formulation of Example 1 was 0.14%.

The Antimicrobial assay as described in the Materials and Methods section above gave the following result:

| | | |
|---|---|---|
| Inoculum of Staphylococcus aureus | $1.7 \times 10^9$ | Viable cells per ml, |
| Zero time in the assay | $1.35 \times 10^6$ | Viable cells per ml, |
| One Minute Exposure | $2.2 \times 10^4$ | Viable cells per ml, and |
| One Minute Log Reduction | 1.15 Logs. | |

Example 2—Egg White/Gelatin/Agar Formulation Using an Oil in Water Emulsion as a Functional Ingredient In this example a combination of gelatin and agar was used to modulate the solubility and thermal tolerance of the whisked egg white formulation. Gelatin starts to melt at temperatures in the region of 35° C. and the stability of the finished formulation having only gelatin as a gelling agent is subject to flow and deformation if storage temperatures exceed the melting temperature of gelatin (35° C.). Agar is a polysaccharide gel which melts at 80° C. and remains liquid at temperatures down to 45° C. In combination with gelatin the characteristic hysteresis of agar can be used to improve thermal stability of formulations without losing the low temperature solubilization of the gelatin. Glycerol is added in this Example to prevent excessive drying, its humectant effect retains residual water.

TABLE 2

Foamed egg white matrix formulation of Example 2.

| | Ingredient | Weight in grams |
|---|---|---|
| 1 | Purified water | 300 |
| 2 | Citric Acid | 1.0 |
| 3 | Agar | 7.6 |
| 4 | Gelatin 260 bloom | 20 |
| 5 | Purified Water | 50 |
| 6 | glycerol | 25 |
| 7 | Egg white at 20% protein concentration whisked to firm peaks | 50 |

TABLE 2-continued

Foamed egg white matrix formulation of Example 2.

| | Ingredient | Weight in grams |
|---|---|---|
| 8 | Flavoring powder | 8 |
| 9 | Functional emulsion based on U.S. patent application 15/384,372 | 10 |
| | Total weight | 471.6 |

The foamed egg white matrix comprising a functional emulsion was made according to the following process;

(a) Ingredients 1 (purified water), 2 (Citric acid), 3 (agar), and 4 (gelatin) from Table 2 were combined in the amounts delineated in a suitable vessel and allowed about 30 minutes to fully hydrate then the mixture was heated to about 90° C. using a thermocouple in the mass to confirm temperature, (b) in a separate vessel—ingredients 5 (purified water) and 6 (glycerol) from Table 2 were combined in the amounts delineated in a suitable vessel, (c) using suitable scale equipment with whisk attachments carefully ingredient 7 (20% egg white) from Table 2 in the amounts delineated was whisked/beaten in a suitable vessel for approximately 5 minutes to achieve a foam mass that holds its shape when pulled upwards—firm peaks.

(d) When the mixture from step (a) reached 90° C. and the agar had melted the glycerol-water mixture from step (b) was added and stirred well to mix. The temperature will drop to approximately 70° C., and step (e) was immediately performed, (e) 50 grams of the mixture from step (c) was added to the mixture from step (d) and stirred in vigorously, and continuously stirred while heating until temperature exceeded 80° C. upon which heating was turned off and/or the mixture was removed from heating, (f) ingredient 8 (flavoring) from Table 2 was added in the amounts delineated and stirred in, and (g) ingredient 9 (functional emulsion) from Table 2 was added in the amounts delineated and stirred in.

The foam mass can be held at 60° C. for periods of up to 5 hours without significant deterioration. The foam mass can be dispensed to molds and allowed to cool where it forms a firm flexible material.

Assay of Antimicrobial Effect

The total weight of material in formulation in Example 2 was 471.6 grams containing 10 grams of functional emulsion (2.12%). The concentration of Caprylic acid in the functional emulsion was 10% and so the concentration of free Caprylic acid in the formulation was 0.17%.

The Antimicrobial assay as described in the Materials and Methods section above gave the following result:

| Inoculum of Staphylococcus aureus | $2.8 \times 10^9$ | Viable cells per ml, |
|---|---|---|
| Zero time in the assay | $1.9 \times 10^6$ | Viable cells per ml, |
| One Minute Exposure | $2.8 \times 10^4$ | Viable cells per ml, and |
| One Minute Log Reduction | 1.61 Logs. | |

Example 3—Construction of a Formulation with Functional Emulsion Precursors in the Egg White Foam In this example a combination a whisked egg white foam containing lecithin and sodium Caprylate as precursors of the functional emulsion disclosed in Folan U.S. patent application Ser. No. 15/384,372 was constructed. The precursors were converted to the active form of the emulsion after the cooking stage using an organic acid to convert the inactive water-soluble sodium Caprylate to the active oil soluble Caprylic acid. Apart from dispensing with the need to separately construct the functional emulsion, building precursors into the egg white foam before it is cooked gives much greater assurance that the functional ingredients are concentrated in the foam air interface after cooling. Separately adding the fully formed emulsion depends on migration driven by phase repulsion to concentrate the oil droplets at the surface of the foam bubbles.

TABLE 3

Foamed egg white matrix formulation of Example 3.

| | Ingredient | Weight in grams |
|---|---|---|
| | Egg white precursor | |
| 1 | Water | 88.28 |
| 2 | Lecithin S75 from Lipoid AG | 0.24 |
| 3 | Sodium Caprylate from Merck | 1.48 |
| 4 | Egg white powder | 10 |
| | Gel base | |
| 5 | Purified water | 300 |
| 6 | Agar | 9 |
| 7 | Gelatin 260 bloom | 10 |
| 8 | Purified Water | 50 |
| 9 | glycerol | 25 |
| 10 | Egg white precursor whisked to firm peaks | 50 |
| 11 | Flavoring powder | 8 |
| 12 | Citric acid | 2.2 |
| | Total weight | 454.2 |

The foamed egg white matrix comprising precursors to a functional emulsion was made according to the following process;

(a) Ingredients 1 (Water) and 2 (lecithin) from Table 3 were combined in the amounts delineated in a suitable vessel at room temperature and allowed about 10 minutes to hydrate, (b) ingredient 3 (sodium Caprylate) from Table 3 was added in the amounts delineated and allowed sufficient time for full solubilization before proceeding, (c) ingredient 4 (egg white powder) from Table 3 was added in the amounts delineated and wetted fully using a spatula, and allowed about 30 minutes to fully hydrate, (d) in a separate suitable vessel ingredients 5 (purified water), 6 (agar), and 7 (gelatin) from Table 3 were combined in the amounts delineated and allowed about 30 minutes to fully hydrate then the mixture was heated to about 90° C. using a thermocouple in the mass to confirm temperature, (e) while the mixture from step (d) was coming up to temperature using suitable scale equipment with whisk attachment the fully hydrated composition from step (c) was whisked/beaten for approximately 5 minutes to achieve a foam mass that holds its shape when pulled upwards—firm peaks forming ingredient 10, (f) when the mixture from step (d) reached about 90° C. and the agar had melted ingredients 8 (purified water) and 9 (glycerol) from Table 3 were combined in the amounts delineated in a separate vessel and added to mixture from step (d), stirred well. The temperature will drop to approximately 70° C. and step (g) was immediately performed, (g) 50 grams of the mixture from step (e)(ingredient 10) was added to the mixture from step (d) and stirred in vigorously while heating, and continuously stirred until the temperature exceeded 80° C. upon which heating was turned off and/or the mixture was removed from heating, (h) ingredient 11 (flavoring) from Table 3 was added in the amounts delineated and stirred to dissolve, and (i) ingredient 12 (citric acid powder) from Table 3 was added in the amounts delineated and stirred well and allowed sufficient time to dissolve and the pH was checked to ensure it is less than 5.0.

The foam mass can be held at 60° C. for periods of up to 5 hours without significant deterioration. The foam mass can be dispensed to molds and allowed to cool where it forms a firm flexible material.

Assay of Antimicrobial Effect:

The total weight of the formulation in Examples 3 was 454.2 grams containing 0.736 grams of sodium Caprylate (0.16%) in 50 grams of whisked egg white. The molecular weight of sodium Caprylate was 166.19 and that of Caprylic acid was 144.21, the conversion factor 1.15 and so if all the dose load of sodium Caprylate was converted to free Caprylic acid on acidification the concentration of free Caprylic acid in the formulation was 0.14%.

The Antimicrobial assay as described in the Materials and Methods section above gave the following result:

| | |
|---|---|
| Inoculum of Staphylococcus aureus | $1.83 \times 10^9$ Viable cells per ml, |
| Zero time in the assay | $2.54 \times 10^6$ Viable cells per ml, |
| One Minute Exposure | $1.97 \times 10^3$ Viable cells per ml, and |
| One Minute Log Reduction | 2.53 Logs. |

Example 4—Alternative Method of Developing an Egg White Foam

In some situations where suitable whisking equipment is not readily available it is possible to develop an adequate protein foam using hydrogen peroxide and a catalase enzyme. A much more concentrated egg white protein is required together with gelatin which has been fully hydrated at room temperature. Hydrogen peroxide is available as 8%, 16% and 32% solutions, the higher concentrations presenting a significant chemical burn hazard if accidentally splashed on human skin. The optimal amount of hydrogen peroxide depends on the concentration in solution and the ambient temperature. Catalase enzymes are commercially available and approved for food use. A very small amount of the enzyme is required to activate decomposition of the peroxide generating a relatively large amount of oxygen which is dispersed throughout the egg white gelatin mass. Continuous stirring is required to maintain the foam and heating to cook should be started as soon as the peroxide reaction has stopped.

TABLE 4

Foamed egg white matrix formulation of Example 4.

| | Ingredient | Weight in grams |
|---|---|---|
| 1 | Purified water | 75 |
| 2 | Gelatin 260 Bloom | 10 |
| 3 | Egg white at 40% protein concentration and water | 100 |
| 4 | 16% hydrogen peroxide | 10 |
| 5 | Catalase 929L from Biocatalysts, Cardiff, UK | 0.2 |
| 6 | Sorbitol | 60 |
| 7 | Powdered flavoring | 4 |
| 8 | Functional emulsion based on U.S. patent application 15/384,372 | 4 |
| 9 | Citric Acid | 0.5 |
| | Total weight | 263.7 |

The foamed egg white matrix comprising a functional emulsion was made according to the following process;

(a) Ingredients 1 (purified water) and 2 (gelatin) from Table 4 were combined in the amounts delineated in a suitable vessel at room temperature and allowed about 30 minutes to fully hydrate the gelatin, (b) ingredient 3 was made by adding 40 grams of egg white to 60 grams of water, wetting the powder carefully using a spatula and allowing it to fully hydrate over a period of about 30 mins, (c) the mixtures from steps (a) and (b) were combined and blended together, (d) ingredient 4 (hydrogen peroxide) from Table 4 was added in the amounts delineated to the mixture from step (c) and blended in well, then ingredient 5 (catalase) from Table 4 was added in the amounts delineated and blended in well, the foaming reaction started within one minute and continued for a period of approximately 5 minutes during which time the foam mass was stirred continuously, (e) heating was commenced while stirring constantly and using a suitable thermocouple in the foam and the foam mass was brought up to 80° C., (f) ingredient 6 (Sorbitol) from Table 4 was added in the amounts delineated and stirred in. The foam mass will cool to approximately 60° C. due to the endothermic solubilization of the sorbitol, (g) the temperature of the foam mass was held/maintained (using a water bath or Bain Marie) at 60° C., and (h) ingredient 7 (flavoring) from Table 4 was added in the amounts delineated and stirred in.

The foam mass can be held at 60° C. for periods of up to 5 hours without significant deterioration. The foam mass can be dispensed to molds and allowed to cool where it forms a firm flexible material.

Assay of Antimicrobial Effect:

The total weight of the formulation in Example 4 was 263.7 grams containing 4 grams of functional emulsion (1.5%). The functional emulsion contained 10% free Caprylic acid in the oil phase and so the concentration of free Caprylic acid in the formulation of Example 4 was 0.15%.

The Antimicrobial assay as described in the Materials and Methods section above gave the following result:

| | | |
|---|---|---|
| Inoculum of Staphylococcus aureus | $2.66 \times 10^8$ | Viable cells per ml, |
| Zero time in the assay | $1.95 \times 10^5$ | Viable cells per ml, |
| One Minute Exposure | $2.58 \times 10^3$ | Viable cells per ml, and |
| One Minute Log Reduction | 1.37 Logs. | |

Example 5 Egg White/Gelatin/Agar/Chelating Agent Formulation Using an Oil in Water Emulsion as a Functional Ingredient Illustrating the incorporation of sodium hexametaphosphate as a chelating agent with amplified citric acid to counteract its intrinsic alkalinity.

TABLE 5

Foamed egg white matrix formulation of Example 5.

| | Ingredient | Weight in grams |
|---|---|---|
| 1 | Purified water | 350 |
| 2 | Citric Acid monohydrate | 2.0 |
| 3 | Agar | 7.6 |
| 4 | Gelatin 260 bloom | 40 |
| 5 | Sorbitol | 60 |
| 6 | Egg white at 20% protein concentration whisked to firm peaks | 45 |
| 7 | Flavoring powder | 6 |
| 8 | Sodium hexametaphosphate | 4 |
| 9 | Functional emulsion based on U.S. patent application 15/384,372 | 10 |
| | Total weight | 520.6 |

The foamed egg white matrix comprising precursors to a functional emulsion was made according to the following process;
- (a) Ingredients 1 (purified water), 2 (citric acid monohydrate), and 3 (agar) from Table 5 were combined in the amounts delineated in a suitable vessel at room temperature and allowed about 10 minutes to hydrate, and then heated to about 80° C. using a thermocouple in the mass to confirm temperature.
- (b) in a separate container—ingredients 4 (gelatin) and 5 (sorbitol) ingredient 3 (sodium Caprylate) from Table 5 were combined in the amounts delineated and blended as a dry powder,
- (c) using suitable scale equipment with whisk attachments carefully ingredient 6 (20% egg white) from Table 5 in the amounts delineated was whisked/beaten in a suitable vessel for approximately 5 minutes to achieve a foam mass that holds its shape when pulled upwards—firm peaks.
- (d) When the mixture from step (a) reached a temperature about 80° C. and the agar had melted the powder mixture from step (b) was added while constantly stirring. The temperature will drop to approximately 60° C. and step (e) was immediately performed,
- (e) 45 grams of the mixture from step (c) was added to the mixture from step (d) and stirred vigorously, and continuously stirred while heating till the temperature exceeds 80° upon which heating was turned off and/or the mixture was removed from heating,
- (f) ingredient 7 (flavoring) from Table 5 was added in the amounts delineated and stirred in, then ingredient 8 (sodium hexametaphosphate) from Table 5 was added in the amounts delineated and stirred in, them ingredient 9 (functional emulsion) from Table 5 was added in the amounts delineated and stirred in and the pH was checked to be below 5.0.

The foam mass can be held at 60° C. for periods of up to 5 hours without significant deterioration. The foam mass can be dispensed to molds and allowed to cool where it forms a firm flexible material.

In other embodiments sorbitol can be replaced with an equal amount of Erythritol, or another polyol, if required.

Assay of Antimicrobial Effect:

The total weight of the formulation in Example 5 was 520.6 grams containing 10 grams of functional emulsion (1.9%).

Using Antimicrobial assay as described in the Materials and Methods section above the antimicrobial effect was determined to be similar to Example 2 with a 1.6 log reduction in viability after 1 minute of exposure.

TABLE 6

Summary of Antimicrobial Efficacy.

| | Example 1 | Example 2 | Example 3 | Example 4 |
|---|---|---|---|---|
| Inoculum of Staph aureus | $1.7 \times 10^9$ | $2.8 \times 10^9$ | $1.83 \times 10^9$ | $2.66 \times 10^8$ |
| Viable count at zero time in the assay | $1.35 \times 10^6$ | $1.9 \times 10^6$ | $2.54 \times 10^6$ | $1.95 \times 10^5$ |
| Viable count at one Minute Exposure | $2.2 \times 10^4$ | $2.8 \times 10^4$ | $1.97 \times 10^3$ | $2.58 \times 10^3$ |
| One Minute Log Reduction | −1.39 Logs | −1.33 Logs | −2.1 Logs | −1.3 Logs |
| Percent Caprylic acid | 0.14 | 0.17 | 0.14 | 0.15 |
| Percent of greatest effect | 66 | 63 | 100 | 62 |

With the exception of Example 3, while allowing for experimental error, the percentage differences in log reduction in Examples 1, 2, and 4 was more or less in line with Caprylic acid content. Notably, Example 3 had the same concentration of Caprylic acid as Example 1 and exhibited a 34% greater effect. Although not wishing to be bound by the explanation it is suggested that the increased efficacy in Example 3 compared to Example 1 was due to improved release and available dose at the amplified surface of the whisked egg white due to the more finely dispersed nature of the in situ formation of Caprylic acid, compared to its droplet form when incorporated as an emulsion.

Example 6: Synergistic Antimicrobial Effect of Polyphosphate when Combined with Functional Emulsion of Free Fatty Acid The inclusion of hexametaphosphate as an example of a polyphosphate used as a chelating agent is illustrated in Example 5 wherein sodium hexametaphosphate ("SHMP" or "sodium HMP") was included. When evaluating the antimicrobial effect of the formulation in Example 5 it was unexpectedly discovered that the combination of the functional free fatty acid emulsion was acting synergistically with the hexametaphosphate.

All mineral chelating agents will affect a growth suppressing effect on bacteria particularly where essential minerals such as calcium, magnesium, zinc and iron are limited in the media, they achieve this effect by sequestration of the essential minerals. The growth suppressing effect of a chelating agent is easily overcome by supplementing the growth media with the necessary mineral.

A functional emulsion of free fatty acids as disclosed in U.S. patent application Ser. No. 15/384,372 will exert a potent antimicrobial effect as illustrated in Examples 1 to 5 of this application. It was unexpectedly discovered that the functional emulsion amplified the growth suppressing effect of the polyphosphate and did so in the presence of supplemented calcium which would otherwise suppress the effect of the hexametaphosphate.

In order to illustrate the synergistic effect of the combination of functional emulsion and hexametaphosphate it is necessary to construct formulations of both which are at and below their Minimum Inhibitory Concentration and then combine these to measure amplification of effect which is greater than what might be expected as additive.

In the present Example a formulation of functional emulsion was constructed using 8% W/W Caprylic acid and 2% W/W mixed capric/Caprylic tri-glyceride (Miglyol 812N from IOI Oleo, Germany) in the oil phase using 1.56% W/W lecithin and 0.15% Tween 80 as co-surfactant using procedures disclosed in U.S. patent application Ser. No. 15/384,372.

The test organism is *Staphylococcus aureus* NCTC 8325-4 as described in the methods and flask cultures are 100 ml of Luria-Bertani broth (LB broth) in 250 ml Erlenmeyer flasks. LB broth is used instead of brain Heart Infusion because it is more defined and limited in mineral content.

A standard inoculum is grown as described in the methods section and adjusted to a viable cell count of $1\times10^6$ by dilution in sterile saline, 0.1 ml of this is used to aseptically inoculate 100 ml volumes of test media—the inoculum being $1\times10^3$ in the test flask.

The Minimum Inhibitory Concentration of the functional emulsion was determined using the agar dilution method wherein LB agar plates of progressively increasing dilution of functional emulsion are streaked with test organism and evaluated visually for growth after 24 hours incubation at 37° C.

Results are presented in Table 7

Some growth is still detected at 0.5% and so the Minimum Inhibitory Concentration may be considered to be greater than 0.5%: a concentration of 0.375 has no inhibitory effect on growth and this concentration was selected for further study in combination with hexametaphosphate.

TABLE 7

Functional Emulsion Minimum Inhibition Concentration *Staphylococcus aureus* NCTC 8325-4.

| Emulsion weight % | Growth observation |
|---|---|
| 1.56 | No growth |
| 1.25 | No growth |
| 0.937 | No growth |
| 0.625 | No growth |
| 0.563 | No growth |
| 0.5 | Trace pin-head colonies |
| 0.438 | Few pin-head colonies |
| 0.375 | Florid growth |
| 0.313 | Florid growth |
| 0 | Florid growth |

To determine the Minimum Inhibitory effect of hexametaphosphate a series of flasks with 100 ml of LB broth were each supplemented with concentrations of hexametaphosphate ranging from 0% W/W to 1% W/W, each flask was inoculated with a standard inoculum to achieve $1\times10^3$ viable bacterial in the flask, the flasks were incubated at 37° C. in a rotary incubator for 24 hours and evaluated visually for growth at that time. As illustrated in the first row of Table 8 below growth was evident only in the flask with zero concentration of hexametaphosphate, at all concentrations from 0.05% and above growth was apparently inhibited.

Following visual evaluation, 0.5% sterile calcium chloride was added to all flasks and incubation continued for a further 24 hours. Visual examination at 24 hours post addition of calcium chloride revealed full growth in all flasks up to and including 0.27% hexametaphosphate. Hexametaphosphate concentrations including and above 0.5% hexametaphosphate remained inhibited. From this data it can be seen that 0.27% hexametaphosphate will inhibit growth unless there is media supplementation of at least 0.5% calcium chloride in which case there is no inhibitory effect on growth.

TABLE 8

Sodium hexametaphosphate effect on the growth of *S. aureus* in liquid culture.

| | SHMP % | | | | | | | | | | | | | |
|---|---|---|---|---|---|---|---|---|---|---|---|---|---|---|
| | 1.0 | 0.75 | 0.5 | 0.27 | 0.26 | 0.25 | 0.24 | 0.23 | 0.22 | 0.2 | 0.15 | 0.1 | 0.05 | 0 |
| Growth at 24 hr | − | − | − | − | − | − | − | − | − | − | − | − | − | + |
| Add Calcium | All Flasks supplemented with sterile 0.5% Calcium chloride | | | | | | | | | | | | | |
| Growth at 24 hr post CaCl$_2$ supplementation | − | − | − | + | + | + | + | + | + | + | + | + | + | + |

Full growth inhibition will be re-instated however if the media is further supplemented with 0.375% functional emulsion, a concentration which on its own has no growth inhibitory effect.

The synergistic effect is exemplified in the data presented in Table 9 below when supplementing with a functional emulsion which is an oil in water emulsion consisting of finely dispersed droplets of Caprylic acid oil in water which is stabilized with a purified amphipathic lecithin and optionally other ingredients such as co-surfactants (hereinafter referred to as "ML:8").

TABLE 9

ML:8 Hexametaphosphate Synergy.

| Flask | | 12 h | 24 h | 24 H CFU/ml |
|---|---|---|---|---|
| 1 | Control | + | + | >$10^9$ |
| 2 | 0.375% functional emulsion | + | + | >$10^8$ |
| 3 | 0.5% Calcium | + | + | >$10^9$ |
| 4 | 0.27% SHMP | − | − | ~$2 \times 10^2$ |
| 5 | 0.27% SHMP + 0.5% Calcium | + | + | >$10^9$ |
| 6 | 0.375% functional emulsion plus 0.5% calcium chloride | + | + | >$10^8$ |
| 7 | 0.27% SHMP + 0.5% Calcium + 0.375% functional emulsion | − | − | ~$2 \times 10^2$ |

Row 1 in Table 9 is the control flask containing Luria-Bertani (LB) broth and standard inoculum, the terminal plate count shows full growth with greater than $10^9$ viable organisms per ml.

Row 2 in Table 9 is the same LB broth with the same inoculum supplemented with 0.375% functional emulsion, there is florid growth at 12 and 24 hours and a terminal plate count showing just one log less viable cells compared to the control: one log reduction.

Row 3 in Table 9 is a control for calcium chloride showing that this supplement has no effect on growth with the terminal count the same as the control.

Row 4 in Table 9 illustrates that 0.27% hexametaphosphate suppresses growth entirely with a residual viability of $2 \times 10^2$ which is essentially the inoculum that remains viable although suppressed (microbistatic effect not microbicidal).

Row 5 in Table 9 is the same as Row 4 supplemented with 0.5% calcium chloride showing complete reversal of the inhibitory effect of hexametaphosphate with terminal viability the same as the control in Row.

Row 6 in Table 9 is the same as Row 2 supplemented with 0.5% calcium chloride, terminal viability is the same as Row 2 with one log reduction—the addition of calcium chloride does amplify or inhibit the effect of the functional emulsion at the concentrations used in this Example.

Row 7 in Table 9 is the combination of Rows 2 (no inhibition) and 5 (no inhibition) showing full inhibition with residual viability of just $2 \times 10^2$ which is the inhibited inoculum that remains viable throughout the test procedure.

It can be concluded that under conditions of excess calcium, sodium hexametaphosphate has no inhibitory effect on microbial growth. Equally under similar conditions, 0.375% functional emulsion has no inhibitory effect on microbial growth. In combination, in conditions of excess calcium the two components (functional emulsion and hexametaphosphate) act synergistically to completely inhibit microbial growth.

Similar synergistic effects may be demonstrated using other polyphosphates including but not limited to di-sodium orthophosphate, uridine monophosphate and sodium phytate. Using procedures described to generate the data in Table 8 the critical limits of 0.75% di-sodium orthophosphate and 0.2% sodium phytate in combination with 0.5% calcium chloride were identified. Uridine monophosphate was inconclusive at 1%, suggesting its chelating properties are less tenacious.

Using similar procedures, the critical limits for non-phosphate chelators including tri-sodium citrate and Ethylenediaminetetraacetic acid in combination with 0.5% calcium chloride are 0.5% and 0.25% respectively.

It should be noted that the ion binding properties of many chelators is pH dependent, particularly in the case of tri-sodium citrate which is an organic acid salt which dissociates at pH below 6.0.

It will be appreciated by those skilled in the art that the ratios of chelator/calcium chloride/functional emulsion provided in this example have been selected as most appropriate to illustrate the synergistic effect by comparative measurement. That same synergy is manifest in all combinations of the same ingredients even though its measurement might be occluded by excess of any one ingredient.

Example 7 Alternative Formulations with Functional Emulsion Precursors in the Egg White Foam Exemplary formulations of the Foamed egg white matrix have the compositions disclosed in Table 10.

TABLE 10

Exemplary foamed egg white matrix formulation of Example 7.

| | Ingredient | Weight in % |
|---|---|---|
| 1 | Water | 55-65 |
| 2 | Glycerine | 13-16 |
| 3 | Lecithin S75 from Lipoid AG | 0.05-0.50 |
| 4 | Sodium Caprylate | 0.2-1.0 |
| 5 | Agar | 1.0-2.5 |
| 6 | Sorbitol | 5-15 |
| 7 | Gelatin | 2-7 |
| 8 | Whisked Egg White | 2-20 |
| 9 | Functional ingredient | 0-1 |
| 10 | Sugar | 0.1-1.0 |
| 11 | Flavoring | 0.3-2.0 |
| 12 | Citric acid | 0.1-1.5 |

In embodiments the sugar is saccharin.

In embodiments the flavoring is vanillin.

In embodiments the functional ingredient is sodium HMP.

In one embodiment the delivery system comprises an egg white matrix formulation as disclosed in Table 11.

TABLE 11

Foamed egg white matrix formulation.

| | Ingredient | Weight in grams |
|---|---|---|
| 1 | Water | 210 |
| 2 | Glycerine | 50 |
| 3 | Lecithin S75 from Lipoid AG | 1 |
| 4 | Sodium Caprylate | 2.32 |
| 5 | Agar | 5 |
| 6 | Sorbitol | 40 |
| 7 | Gelatin | 10 |
| 8 | Whisked Egg White (20% W/W protein) | 10 |

TABLE 11-continued

Foamed egg white matrix formulation.

| | Ingredient | Weight in grams |
|---|---|---|
| 9 | Sodium HMP | 1 |
| 10 | Saccharin | 1 |
| 11 | Vanillin | 2 |
| 12 | Citric acid | 2 |
| | Total weight | 334.32 |

In one embodiment the delivery system comprises an egg white matrix formulation as disclosed in Table 12.

TABLE 12

Foamed egg white matrix formulation.

| | Ingredient | Weight in grams |
|---|---|---|
| 1 | Water | 215 |
| 2 | Glycerine | 50 |
| 3 | Lecithin S75 from Lipoid AG | 0.5 |
| 4 | Sodium Caprylate | 1.16 |
| 5 | Agar | 6.5 |
| 6 | Sorbitol | 30 |
| 7 | Gelatin | 20 |
| 8 | Whisked Egg White (10% W/W protein) | 30 |
| 9 | Sodium HMP | 2 |
| 10 | Saccharin | 2 |
| 11 | Vanillin | 4 |
| 12 | Citric acid | 3 |
| | Total weight | 364.16 |

Example 8 Alternative Formulations with Functional Emulsion Precursors in the Egg White Foam Exemplary formulations of the Foamed egg white matrix have the compositions disclosed in Table 13.

TABLE 13

Exemplary foamed egg white matrix formulation of Example 8

| | Ingredient | Weight in grams % |
|---|---|---|
| 1 | Water | 40-60 |
| 2 | Glycerine | 13-15 |
| 3 | Agar | 1.0-2.5 |
| 4 | Sorbitol | 5-15 |
| 5 | Gelatine | 1-10 |
| 6 | Whisked Egg White | 5-25 |
| 7 | Functional ingredient | 0-1 |
| 8 | Sugar | 0.1-1 |
| 9 | Flavoring | 0.3-2.0 |
| 10 | Citric acid | 0.5-7.0 |
| 11 | Functional emulsion | 3-10 |

In embodiments the sugar is saccharin.
In embodiments the flavoring is vanillin.
In embodiments functional ingredient is sodium HMP. In other embodiments there is no addition of a function ingredient other than the functional emulsion.
In embodiments the functional emulsion is an oil in water emulsion consisting of finely dispersed droplets of Caprylic acid oil in water which is stabilized with a purified amphipathic lecithin and optionally other ingredients such as co-surfactants (hereinafter referred to as "ML:8"). In other embodiments the functional emulsion is added as precursor mixture comprising sodium Caprylate, lecithin, Lipoid S75, and water (hereinafter referred to as "ML:8 precursor"), which is converted to the active form of the emulsion after cooking stage using an organic acid to convert the inactive water-soluble sodium Caprylate to the active oil soluble Caprylic acid.

In one embodiment the delivery system comprises an egg white matrix formulation as disclosed in Table 14.

TABLE 14

Exemplary foamed egg white matrix formulation of Example 8

| | Ingredient | Weight in grams |
|---|---|---|
| 1 | Water | 170 |
| 2 | Glycerine | 50 |
| 3 | Agar | 6.5 |
| 4 | Sorbitol | 30 |
| 5 | Gelatine | 20 |
| 6 | Whisked Egg White (10% W/W protein) | 30 |
| 7 | Sodium HMP | 2 |
| 8 | Saccharin | 2 |
| 9 | Vanillin | 4 |
| 10 | Citric acid (20% W/W solution) | 30 |
| 11 | ML:8 precursor | 18 |
| | Total weight | 362.5 |

In one embodiment the delivery system comprises an egg white matrix formulation as disclosed in Table 15.

TABLE 15

Exemplary foamed egg white matrix formulation of Example 8

| | Ingredient | Weight in grams |
|---|---|---|
| 1 | Water | 170 |
| 2 | Glycerine | 50 |
| 3 | Agar | 6.5 |
| 4 | Sorbitol | 20 |
| 5 | Gelatine | 20 |
| 6 | Whisked Egg White (10% W/W protein) | 30 |
| 7 | Sodium HMP | 2 |
| 8 | Saccharin | 2 |
| 9 | Vanillin | 4 |
| 10 | Citric acid (20% W/W solution) | 30 |
| 11 | ML:8 precursor | 18 |
| | Total weight | 352.5 |

In one embodiment the delivery system comprises an egg white matrix formulation as disclosed in Table 16.

TABLE 16

Exemplary foamed egg white matrix formulation of Example 8

| | Ingredient | Weight in grams |
|---|---|---|
| 1 | Water | 170 |
| 2 | Glycerine | 50 |
| 3 | Agar | 6.5 |
| 4 | Sorbitol | 10 |
| 5 | Gelatine | 20 |
| 6 | Whisked Egg White (10% W/W protein) | 30 |
| 7 | Sodium HMP | 2 |

TABLE 16-continued

Exemplary foamed egg white matrix formulation of Example 8

| | Ingredient | Weight in grams |
|---|---|---|
| 8 | Saccharin | 2 |
| 9 | Vanillin | 4 |
| 10 | Citric acid (20% W/W solution) | 30 |
| 11 | ML:8 precursor | 18 |
| | Total weight | 342.5 |

In one embodiment the delivery system comprises an egg white matrix formulation as disclosed in Table 17.

TABLE 17

Exemplary foamed egg white matrix formulation of Example 8

| | Ingredient | Weight in grams |
|---|---|---|
| 1 | Water | 170 |
| 2 | Glycerine | 50 |
| 3 | Agar | 6.5 |
| 4 | Sorbitol | 30 |
| 5 | Gelatine | 15 |
| 6 | Whisked Egg White (10% W/W protein) | 30 |
| 7 | Sodium HMP | 2 |
| 8 | Saccharin | 2 |
| 9 | Vanillin | 4 |
| 10 | Citric acid (20% W/W solution) | 30 |
| 11 | ML:8 precursor | 18 |
| | Total weight | 357.5 |

In one embodiment the delivery system comprises an egg white matrix formulation as disclosed in Table 18.

TABLE 18

Exemplary foamed egg white matrix formulation of Example 8

| | Ingredient | Weight in grams |
|---|---|---|
| 1 | Water | 170 |
| 2 | Glycerine | 50 |
| 3 | Agar | 6.5 |
| 4 | Sorbitol | 30 |
| 5 | Gelatine | 5 |
| 6 | Whisked Egg White (10% W/W protein) | 30 |
| 7 | Sodium HMP | 2 |
| 8 | Saccharin | 2 |
| 9 | Vanillin | 4 |
| 10 | Citric acid (20% W/W solution) | 30 |
| 11 | ML:8 precursor | 18 |
| | Total weight | 347.5 |

In one embodiment the delivery system comprises an egg white matrix formulation as disclosed in Table 19.

TABLE 19

Exemplary foamed egg white matrix formulation of Example 8

| | Ingredient | Weight in grams |
|---|---|---|
| 1 | Water | 170 |
| 2 | Glycerine | 50 |
| 3 | Agar | 6.5 |
| 4 | Sorbitol | 30 |
| 5 | Gelatine | 0 |

TABLE 19-continued

Exemplary foamed egg white matrix formulation of Example 8

| | Ingredient | Weight in grams |
|---|---|---|
| 6 | Whisked Egg White (10% W/W protein) | 30 |
| 7 | Sodium HMP | 2 |
| 8 | Saccharin | 2 |
| 9 | Vanillin | 4 |
| 10 | Citric acid (20% W/W solution) | 30 |
| 11 | ML:8 precursor | 18 |
| | Total weight | 342.5 |

In one embodiment the delivery system comprises an egg white matrix formulation as disclosed in Table 20.

TABLE 20

Exemplary foamed egg white matrix formulation of Example 8

| | Ingredient | Weight in grams |
|---|---|---|
| 1 | Water | 170 |
| 2 | Glycerine | 50 |
| 3 | Agar | 6.5 |
| 4 | Sorbitol | 30 |
| 5 | Gelatine | 20 |
| 6 | Whisked Egg White (10% W/W protein) | 30 |
| 8 | Saccharin | 2 |
| 9 | Vanillin | 4 |
| 10 | Citric acid (20% W/W solution) | 15 |
| 11 | ML:8 precursor | 2.25 |
| | Total weight | 329.75 |

In one embodiment the delivery system comprises an egg white matrix formulation as disclosed in Table 21.

TABLE 21

Exemplary foamed egg white matrix formulation of Example 8

| | Ingredient | Weight in grams |
|---|---|---|
| 1 | Water | 200 |
| 2 | Glycerine | 50 |
| 3 | Agar | 6.5 |
| 4 | Sorbitol | 30 |
| 5 | Gelatine | 20 |
| 6 | Whisked Egg White (10% W/W protein) | 30 |
| 7 | Sodium HMP | 2 |
| 8 | Saccharin | 2 |
| 9 | Vanillin | 4 |
| 10 | Citric acid (20% W/W solution) | 15 |
| 11 | ML:8 precursor | 2.25 |
| | Total weight | 361.75 |

The invention claimed is:

1. A delivery system for functional ingredients comprising one or more functional ingredient(s) substantially uniformly dispersed in a matrix, wherein said matrix comprises:
   i) an egg white foam comprising between 1-50% protein;
   ii) one or more heat resistant and/or heat sensitive gelling agents;
   iii) a pH regulator;
   iv) one or more plasticizers and/or humectants; and
   v) one or more sources of water.

2. The delivery system according to claim 1, wherein said one or more gelling agents comprises agar.

3. The delivery system according to claim 1, wherein said one or more gelling agents comprises gelatin.

4. The delivery system according to claim 1, wherein said one or more gelling agents comprises pectin.

5. The delivery system according to claim 1, wherein said one or more gelling agents comprises at least two gelling agents selected from agar, gelatin, and pectin.

6. The delivery system according to claim 1, wherein said pH regulator is citric acid.

7. The delivery system according to claim 1, wherein said one or more functional ingredient(s) comprises a functional emulsion.

8. The delivery system according to claim 1, comprising two or more functional ingredient(s).

9. The delivery system according to claim 7, further comprising a chelating agent.

10. The delivery system according to claim 9, wherein the chelating agent is a polyphosphate.

11. The delivery system according to claim 10, wherein the polyphosphate is sodium hexametaphosphate.

12. The delivery system according to claim 1, wherein said one or more functional ingredients are selected from the group of drugs, botanicals, nutritional supplements, vitamins, minerals, enzymes, hormones, proteins, polypeptides and antigens.

13. The delivery system according to claim 1, further comprising a sweetener, a buffer, a natural or artificial flavoring, a coloring agent, or a combination thereof.

14. A dual action dental chew for dogs, wherein the dental chew comprises two components; a flexible base and a filling, and wherein the filling comprises the delivery system according to claim 1.

15. The dual action dental chew for dogs according to claim 14, wherein the flexible base is shaped and designed to reduce plaque and calculus through mechanical action during the chewing process, and wherein the flexible base features a reservoir or cavity for the filling.

16. The dual action dental chew for dogs according to claim 14, wherein the mechanical action is scrubbing and/or abrasion.

17. The dual action dental chew for dogs according to claim 14, wherein the delivery system comprises a functional ingredient comprising an emulsion comprising (a) one or more saturated or unsaturated free fatty acids having from 4 to 22 carbon atoms or a pharmaceutically acceptable salt thereof; and (b) one or more delipidised membrane lipids, as emulsifying agent for the free fatty acid(s) or the salt thereof.

18. A method of using the delivery system according to claim 1 for oral administration of one or more functional ingredient to an animal in need thereof comprising administering the delivery system to the animal in need.

* * * * *